(12) United States Patent
Udomkesmalee

(10) Patent No.: US 6,766,270 B2
(45) Date of Patent: Jul. 20, 2004

(54) GRAVITY-REFERENCE VISION SYSTEM

(75) Inventor: Suraphol Udomkesmalee, Simi Valley, CA (US)

(73) Assignee: American GNC Corporation, Simi Valley, CA (US)

(*) Notice: Subject to any disclaimer, the term of this patent is extended or adjusted under 35 U.S.C. 154(b) by 0 days.

(21) Appl. No.: 10/388,283

(22) Filed: Mar. 12, 2003

(65) Prior Publication Data

US 2003/0182076 A1 Sep. 25, 2003

Related U.S. Application Data

(60) Provisional application No. 60/363,800, filed on Mar. 12, 2002.

(51) Int. Cl.[7] ............................................. G01C 21/00
(52) U.S. Cl. ....................... 702/150; 702/149; 702/152; 701/213; 701/214
(58) Field of Search ................................. 702/150, 152, 702/153, 149; 701/214, 213, 215, 216, 211, 220, 23

(56) References Cited

U.S. PATENT DOCUMENTS 5,112,126 A * 5/1992 Graebner .................. 356/141.5
6,427,122 B1 * 7/2002 Lin ............................ 701/214

* cited by examiner

Primary Examiner—John Barlow
Assistant Examiner—Hien Vo
(74) Attorney, Agent, or Firm—Raymond Y. Chan; David and Raymond Patent Group

(57) ABSTRACT

An efficient approach to extract an object's position and orientation in a 3 dimensional space is disclosed. This approach combines inertial sensor data with ranging and imaging devices and establishes vision processing under leveled conditions as determined by the gravity vector. By determining a leveled condition, this approach provides an effective way to exploit the object's position and orientation along the horizontal plane from horizontal range measurements and simplify processing of image data, which maps the vertical plane information. The system can be used to aid the object detection and identification process.

6 Claims, 8 Drawing Sheets

GRAVITY-REFERENCE VISION SYSTEM

CROSS REFERENCE OF RELATED APPLICATION

The is a regular application of a provisional application, application No. 60/363,800, filed Mar. 12, 2002.

FIELD OF THE PRESENT INVENTION

The present invention relates to machine vision and more particularly to a method and system for determining an object's position and orientation in a 3 dimensional space. The system can be used to aid the object detection and identification process.

BACKGROUND OF THE PRESENT INVENTION

There is a demand for determining an object's position and orientation using machine vision. The current technology utilizes complex image processing algorithms for 2 dimensional or 3-dimensional images. Arbitrary range and orientation configurations of an object typically cause such processing algorithms to be unreliable and slow—this has limited the utilization of machine vision to very few applications where the operating environments (with respect to lighting, object's shape and orientation) are tightly controlled.

The disadvantage associated with processing only image data to extract object's position and orientation is the necessary capability to process extraordinary amounts of information. Different poses and sizes of an object and lighting conditions manifest in large variations of image signatures. Previous methods for dealing with image data included pattern matching techniques. These techniques rely upon models and correlation algorithms in order to recognize and isolate objects within image data. These pattern matching techniques are limited by their lack of robustness. Their results degrade significantly across spatial and temporal variations. They are inadequate at recognizing objects from a broad range of pose, size, and lighting variations. They require a tremendous amount of computation. Also, these techniques do not respond well to increasing number of models (or object templates) in a database needed to detect the variations within the image data.

It is also noted that the image data represent a complex set of functions and that object images are not easily detected and identified without prior knowledge of objects and background characteristics. The traditional method for object detection and identification using image data is to use a large number of reference signatures (or training sets). The disadvantage of this method is huge computational load and low accuracy.

SUMMARY OF THE PRESENT INVENTION

A main objective of a gravity-reference vision system of the present invention is to provide an effective method to combine an inertial sensor with ranging and imaging devices and establish vision processing under leveled conditions. An example system configuration of the present invention is shown in FIG. 1. An inertial sensor which is sensitive to the gravity field can be employed to determine leveled conditions for the sensing platform—this defines a horizontal (leveled) plane where horizontal object dimensions and position can be easily estimated from a ranging device, wherein a sweep of range data is made by rotating either the ranging device or its steering beam-in-plane. Thus, processing of imaging data from an imager (which provides a vertical plane information) to extract the object's position/orientation becomes trivial when the knowledge of the previously defined viewing plane and object's estimated range/orientation in the horizontal plane is exploited. Processing of the integrated inertial sensor, ranging device and imager data provides a complete 3-dimensional position/orientation of an object.

It is a further objective of the present invention to establish a horizontal viewing of range-to-object information using an inertial sensor along with a ranging device.

It is a further objective of the present invention to provide an image processing method that employs object's position and orientation information in the horizontal (leveled) plane in the extraction of position and orientation in the vertical plane, and thus completes the 3-dimensional position/orientation determination of an object.

It is a further objective of the present invention to determine different object's surfaces as viewed along the horizontal (leveled) plane by bifurcating two different segments along the range measurements—defining one segment to the left of the minimum range point and another segment to the right of the minimum range point.

It is a further objective of the present invention to accommodate the tilt angles as defined by the ground slope and provide a generic definition of a leveled condition by transforming the gravity constant into respective XYZ components along the body-fixed axes.

DETAILED DESCRIPTION OF THE PREFERRED EMBODIMENT

The present invention provides an efficient approach to determine an object's position and orientation for object detection and identification. This approach uses an inertial sensor, which is sensitive to the gravity field, to determine a leveled condition for the sensing platform and provide a reference for detecting and recognizing ground-based objects. The leveled condition is defined in a generic sense to include leveling of the sensing platform parallel to the ground. By imaging at a leveled condition, there is only one degree of freedom involved with respect to the object rotation instead of the typical three rotational degrees of freedom associated with an object. The leveled viewing of an object from a fixed-distance but from different vantage points is equivalent to viewing the object form a fixed position and having the object rotate about its vertical axis. By eliminating the need to include information about the object when it is not at a leveled condition, the computational load is dramatically reduced. The accuracy of object detection is also enhanced due to the known tilt information of the object derived from the gravity field sensing.

The possible application of the gravity-reference vision approach of the present invention for object detection and identification assumes that the object is placed along the ground. In general robotic platforms, it is commonly assumed that the sensing platform has a complete 6 degrees of freedom motion (3 degrees of freedom in translation and 3 degrees of freedom in rotation). Therefore, the object detection and identification must ascertain the position and rotation information relative to the sensing platform. Using the known tilt information, which corresponds to the ground slope and the object's tilt angles, the object detection and identification process can be greatly simplified and accomplished with great efficiency at the leveled condition.

Figure 1:
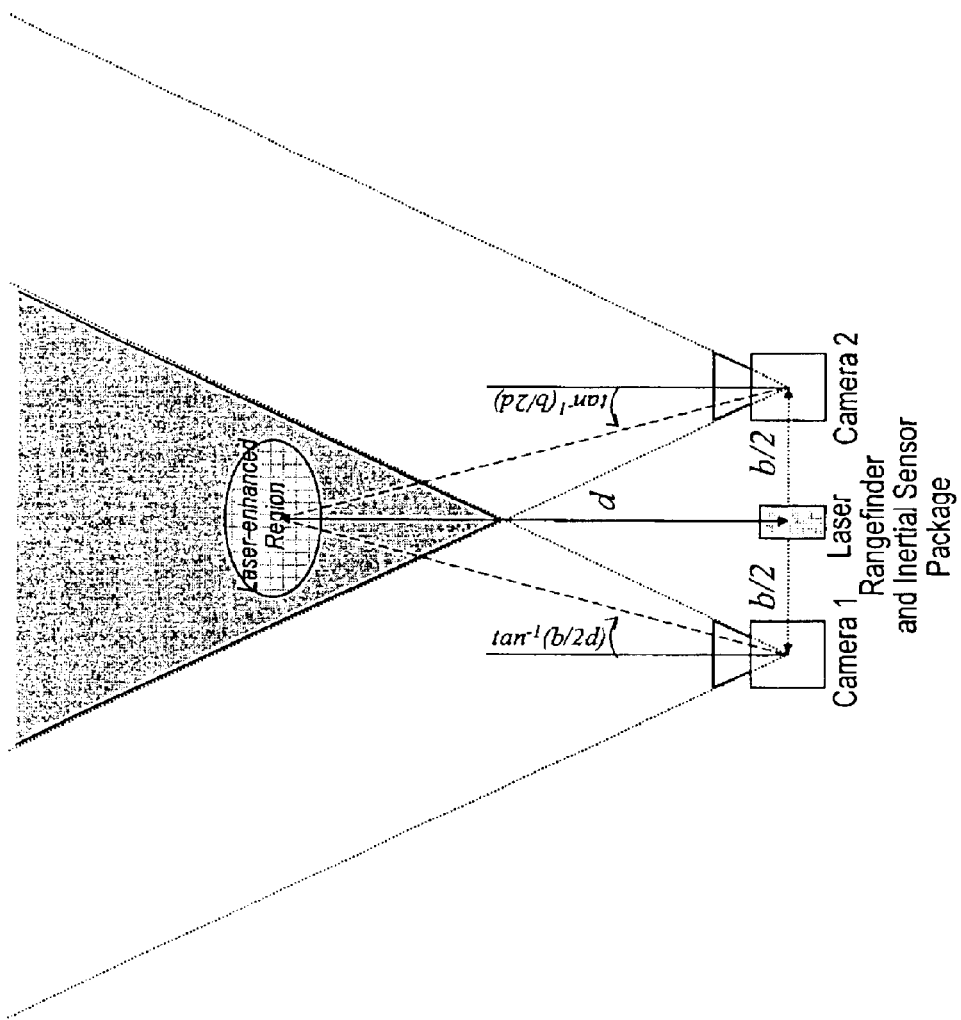
FIG. 1 is an example system configuration of the gravity-reference vision system.
Figure 2:
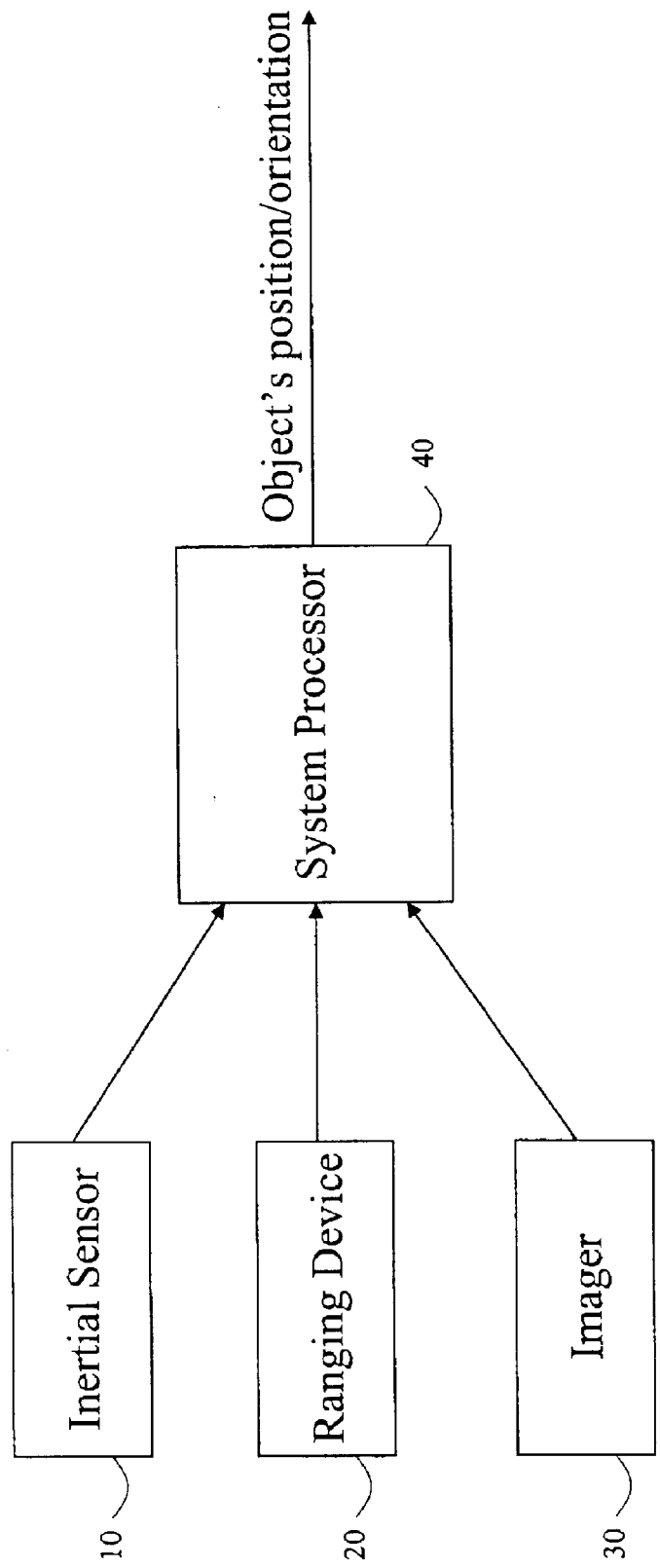
FIG. 2 is a block diagram of the gravity-reference vision system that effectively combines inertial sensor, ranging device, and imager to estimate object's position and orientation.

Referring to FIG. 2, the gravity-reference vision system consists of 4 functional elements. They are an inertial sensor input module 10, a ranging device input module 20, an imager input module 30, and a system processor module 40.

The inertial sensor input module 10 senses the gravity vector, which allows the sensing platform to extract the tilt information and level itself for subsequent ranging, imaging, and data processing. The ranging device input module 20 scans horizontally to establish range values to potential objects, by rotating either the ranging device or its steering beam-in-plane. The imager input module 30 provides the object scene (which represent the image projection of the vertical plane) for image processing and analysis under the leveled condition. Through exploitation of the tilt and range information, the system processor 40 combines an inertial sensor with ranging and imaging devices and performs vision processing under a leveled condition to provide a complete 3-dimensional position/orientation of an object.

The gravity-reference vision system according to the preferred embodiment of the present invention includes the following processing steps (performed by the system processor):

(1) Read inertial sensor data, wherein the inertial sensor mounted on a sensing platform may be maneuvered through translational and rotational movements;

(2) Determine a leveled condition by an appropriate mapping of the gravity vector. If a leveled condition is satisfied, then proceed to step (3), else return to step (1);

(3) Process horizontal range measurements, wherein a sweep of range data is made by rotating the ranging device or steering beam in-plane and read by the system processor;

(4) Process image data, wherein an imager projects a view along the vertical plane onto a focal plane and subsequently read by the system processor;

(5) Output the object's position and orientation in a 3-dimensional space.

Figure 3:
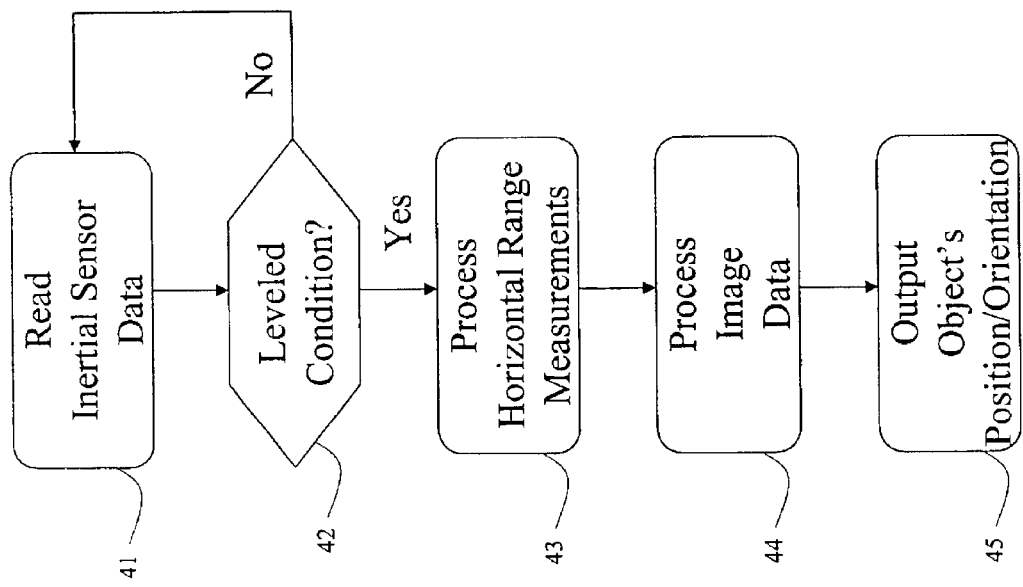
FIG. 3 is a block diagram of the high-level operation flow of the gravity-reference vision system.

The preferred implementation of the system processor is shown in FIG. 3, where it comprises a read inertial sensor module 41, a leveled condition checking module 42, a process horizontal range measurements module 43, a process image data module 44, and a output object's position/orientation module 45.

Figure 4:
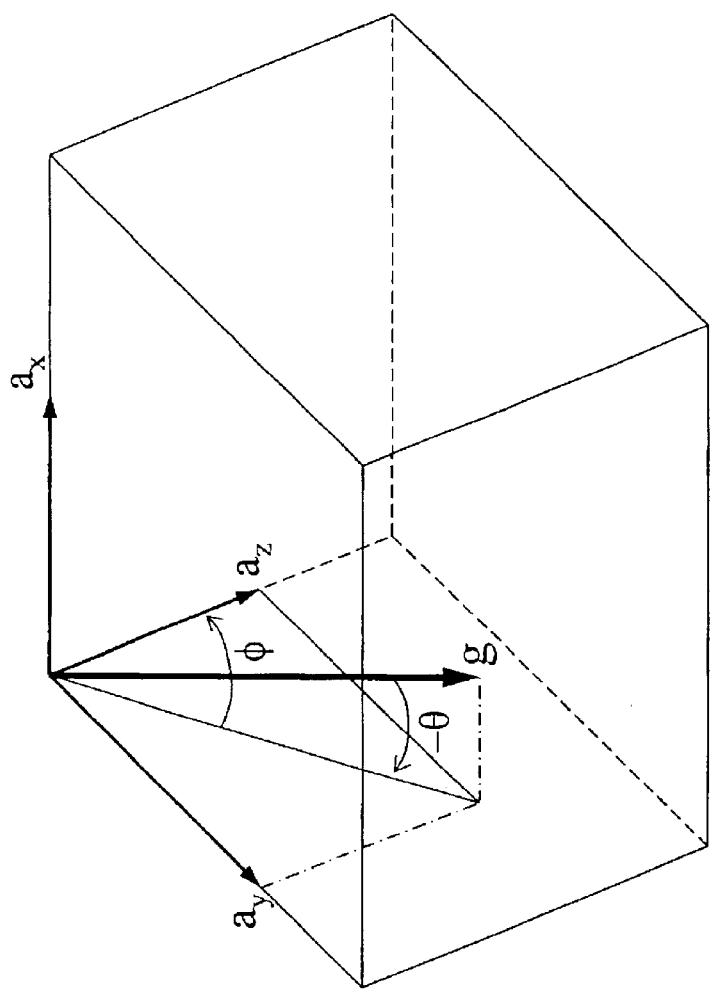
FIG. 4 shows the geometry of the inertial sensor reflecting the leveled condition determined by gravity (g) given two tilt angles ($\phi$ and $\theta$).

According to the preferred embodiment of the present invention, step (2) further comprises the steps of comparing outputs of the inertial sensor to some reference values and determining the closeness to the reference values. For example, if a 3-axis accelerometer unit is employed as the inertial sensor, then a leveled condition can be determined when the acceleration for the vertical-pointing (Z) axis ($a_z$) is the gravitational constant (g), and no acceleration components along the horizontal (XY) plane ($a_x$ and $a_y$). Furthermore, different ground slopes can be accommodated by either calibrating what acceleration readouts would be needed to aligned the sensing platform along the ground level or using known tilt angles ($\phi$ and $\theta$) to transform the downward gravity component into 3 separate XYZ components as shown in FIG. 4. The use of a known XYZ mapping of the gravity component as reference to the leveled condition (such as $a_x = -g \sin \theta$, $a_y = g \cos \theta \sin \phi$, and $a_z = g \cos \theta \cos \phi$) also allows slowly moving sensing platform to be non-stationary while gathering range and image data, that is, ranging and imaging sensors can be continuously active. Only ranging and imaging data taken during the time when the sensing platform is leveled are used for subsequent processing—this eliminates the need to tightly control and stabilize the sensing platform during the data collection period for the ranging device and imager.

Figure 5:
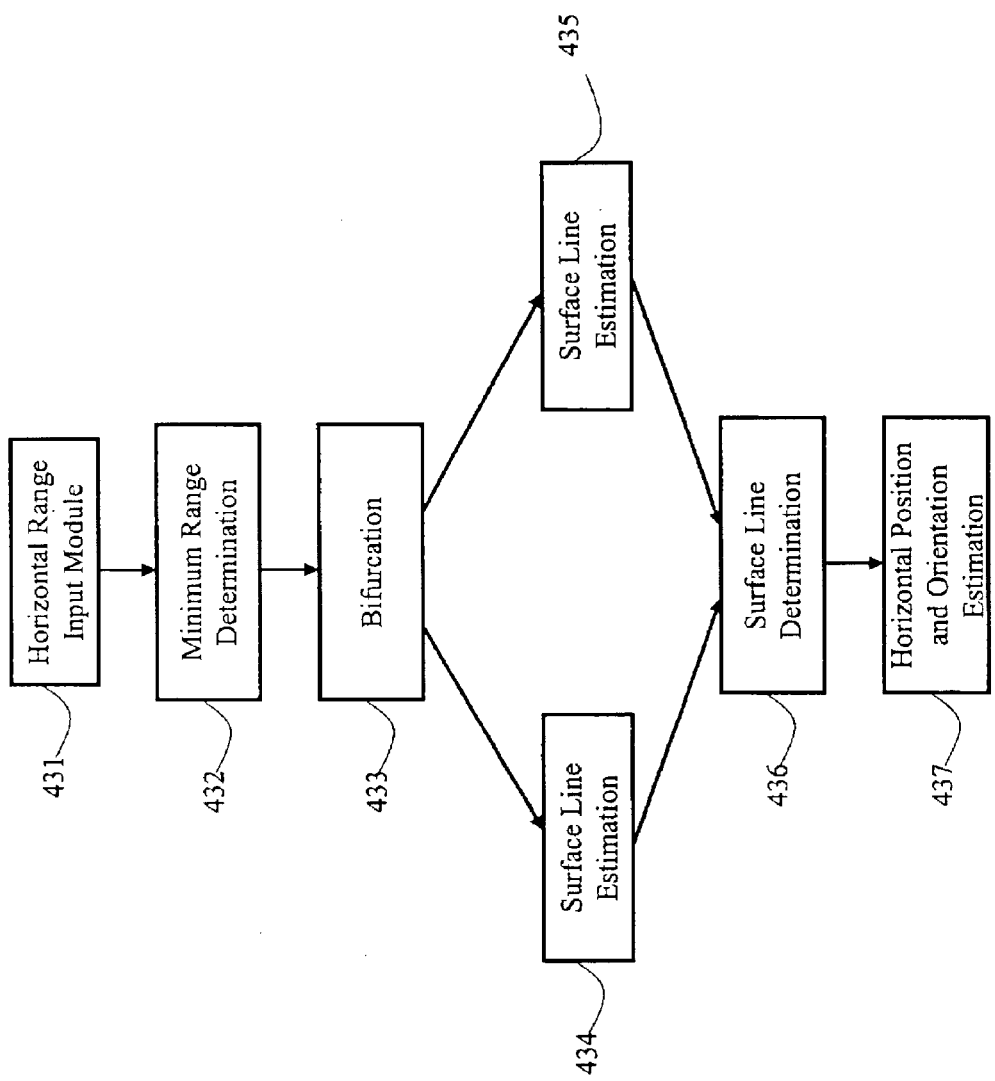
FIG. 5 is a block diagram illustrating the processing of horizontal range measurements.

According to the preferred embodiment of the present invention, Step (3) further comprises of the following steps (as shown in FIG. 5):

(3.1) Input horizontal range measurements, wherein a measurement pair of bearing angle and range values are employed to define the position of the ranging point relative to the sensing platform.

(3.2) Determine the minimum range position from the measurement pairs of bearing angles and range values.

(3.3) Bifurcate the range measurement data into two segments, wherein one segment is defined as measurement pairs to the left of the minimum range position, and another segment is defined as measurement pairs to the right of the minimum range position.

(3.4) Estimate surface line for each segment, wherein the line estimator is a least square estimator.

(3.5) Check if both segments are parallel to each other, then combine both segments into one; else if both segments are orthogonal to each other, then treat them as separate surfaces.

(3.6) Estimate the object position and orientation along the horizontal plane by comparing the estimated surface line(s) with the known knowledge about the object dimensions.

Referring to FIG. 5, the horizontal range processing module 43 consists of a horizontal range input module 431, a minimum range determination 432, a bifurcation 433, surface line estimation 434 and 435, a surface configuration determination 436, and a position/orientation estimation 437.

Figure 6:
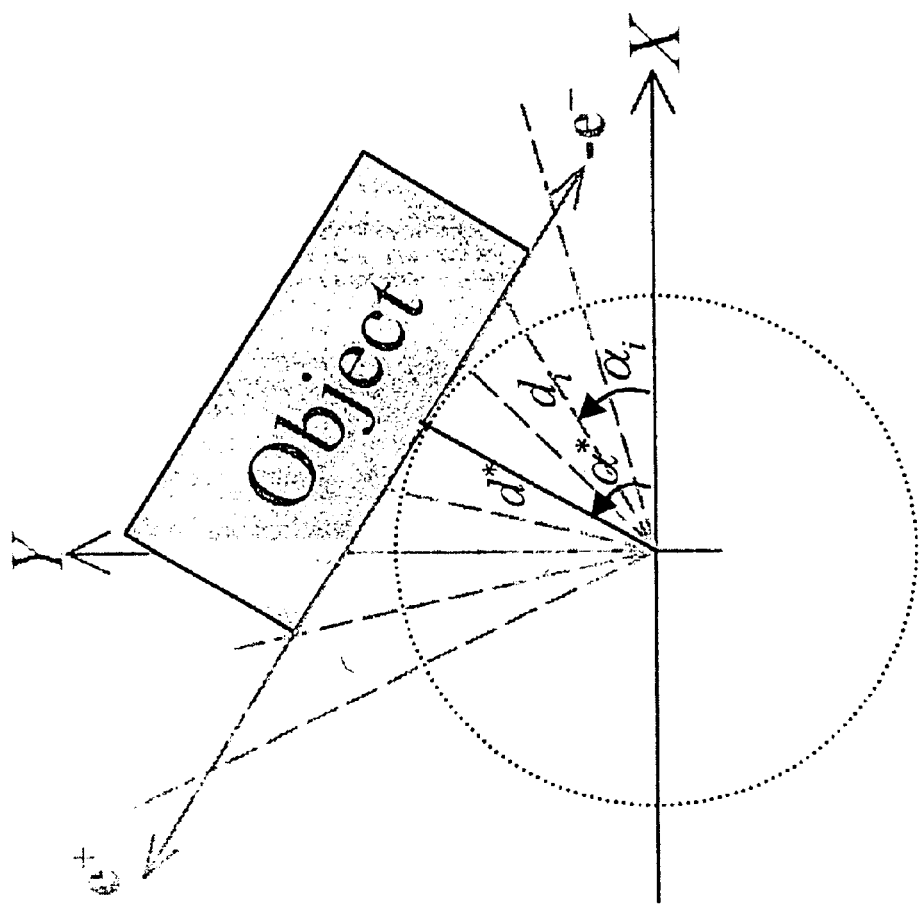
FIG. 6 shows the configuration for one-sided viewing for the horizontal range measurements.
Figure 7:
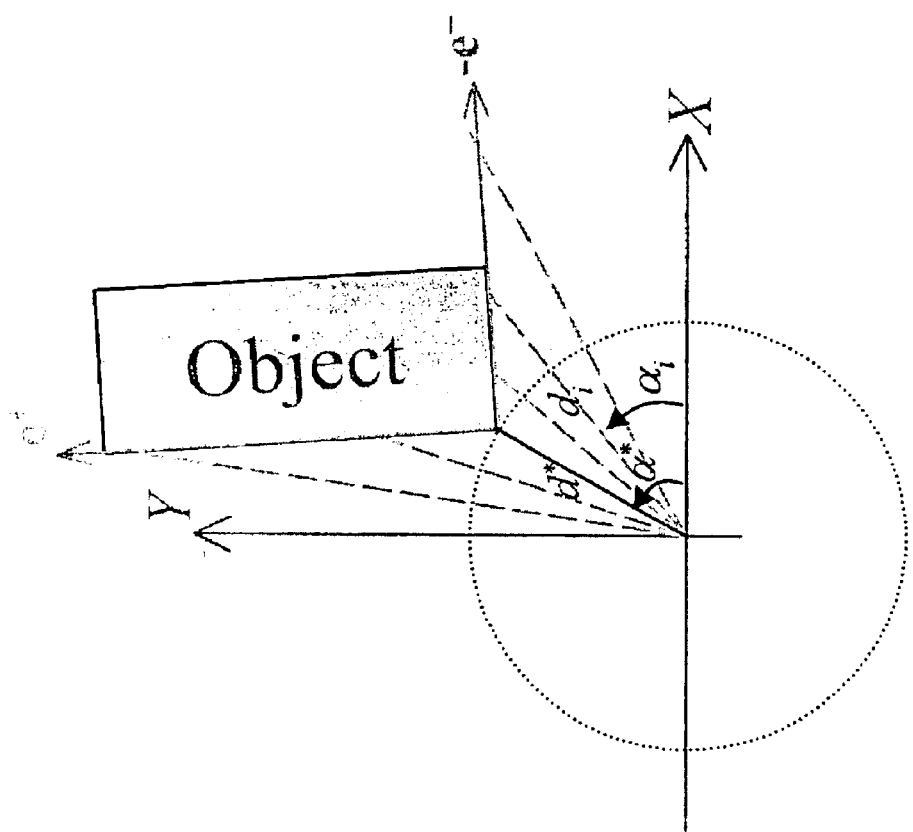
FIG. 7 shows the configuration of two-sided viewing for the horizontal range measurements

The horizontal range input module 431 takes the range measurements from the ranging device 20, wherein each measurement comprises a pair of a bearing angle value ($\alpha_i$) and a range value ($d_i$). Two possible configurations of a rectangular object being scanned at a leveled condition are shown in FIG. 6 (one-sided view) and FIG. 7 (two-sided view). The minimum range determination 432 provides the anchor point (which is the minimum range point denoted by [$\alpha^*, d^*$]) for bifurcation 433 to create two line segments, which can be represented by unit vectors $e^+$ and $e^-$. The surface line estimation 434 and 435 estimates the $e^+$ and $e^-$ vectors from the bifurcated horizontal range data using a least-squares estimator algorithm. The surface configuration determination 436 established the orthogonality of the e⁺ and e⁻ vectors. The orthogonal condition can be determine by computing the dot product of the e⁺ and e⁻ vectors to determine whether the one-sided view (FIG. 6) or the two-sided view (FIG. 7) is presented. For the one-sided view, the dot product is approximately zero indicating parallelism of the unit vectors e⁺ and e⁻. For the two-sided view, the dot product is approximately one indicating orthogonality of the unit vectors e⁺ and e⁻. Finally, the object's position and orientation estimation 437 along the horizontal plane can be computed using either the center line position of the one-sided surface line view to represent object's position and its slope to represent object's orientation or using the center rectangular position of the two-sided surface line view to represent object's position and the slope of one of the surface lines to represented object's orientation.

Figure 8:
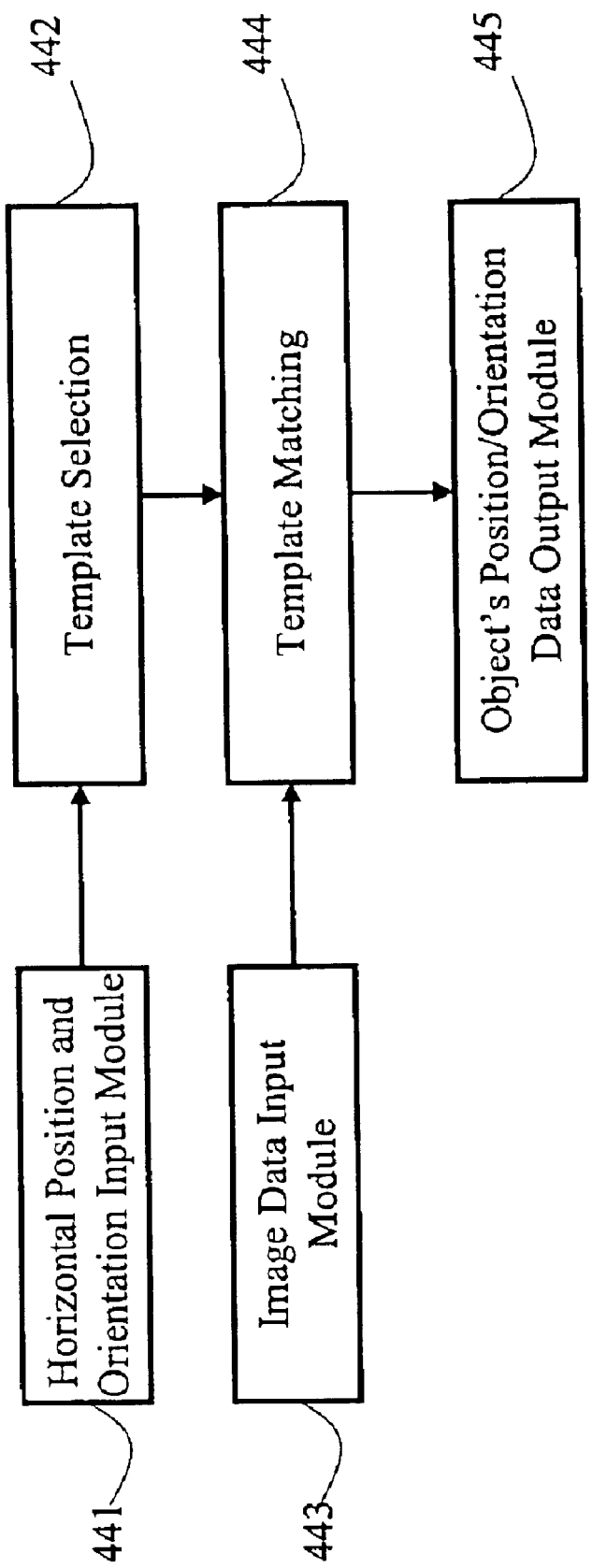
FIG. 8 is a block diagram illustrating the processing of image data and combining of processed information in horizontal and vertical planes.

According to the preferred embodiment of the present invention, step (4) further comprises of the following steps (as shown in FIG. 8):

(4.1) Select an object template that reflects particular size and orientation of the object based on the estimated position and orientation along the horizontal plane.

(4.2) Compare the selected object template to different image areas of image data corresponding to the projected view of the vertical plane and determine the best-matched position.

(4.3) Determine the 3-dimensional object's position and orientation by combining estimated position/orientation for the horizontal plane with the best-matched position and selected template orientation for the vertical plane.

Referring to FIG. 8, the image data processing module 44 consists of an horizontal position/orientation input module 441, a template selection 442, an image data input module 443, a template matching 444, and an object's position/orientation data output module 445.

The horizontal position/orientation input module 441 takes the estimated position/orientation from horizontal range processing module 43 and passes the information to the template selection 442. The template selection 442 selects an object template for the image data that reflects particular size and orientation of the object based on the estimated position and orientation along the horizontal plane. The image data input module 443 takes the image data from the imager 30. The template matching 444 then compares the selected object template to different image areas corresponding to the projected view of the vertical plane and determines the best-matched position. Finally, the object's position/orientation data output module 445 determines the 3-dimensional object's position and orientation by combining estimated position/orientation from range data (which represents the horizontal plane position/orientation information) with the best-matched position from image data (which represents the vertical plane position/orientation information) and resulting object's orientation of the selected template used to obtain the best-matched position.

What is claimed is:

1. A method for data processing of inertial sensor, ranging device, and imager measurements, comprising the steps of:

(a) receiving inertial sensor data for computing leveled conditions using a gravity vector as reference;

(b) determining a leveled condition using said sensed gravity vector, wherein the steps (a) and (b) are repeated until said leveled condition is satisfied;

(c) processing of horizontal range measurements for computing a position and orientation of an object along a horizontal plane, wherein a sweep of range data is made by rotating either said ranging device or a steering beam-in-plane thereof and read by said system processor;

(d) processing of image data for computing said position and orientation of said object, wherein said imager projects a view along a vertical plane onto a focal plane and subsequently read by said system processor; and (e) outputting results of said position and orientation of said object in a 3-dimensional space.

2. The method, as recited in claim 1, wherein said processing algorithm comprises the steps of:

(i) inputting horizontal range measurements for data processing, wherein a measurement pair of said bearing angle and range values are employed to define the position of said ranging point relative to said sensing platform;

(ii) determining the minimum range position from said measurement pairs of bearing angle and range values;

(iii) bifurcating said range measurement data into two segments, wherein one segment is defined as measurement pairs to the left of said minimum range position, and another segment is defined as measurement pairs to the right of said minimum range position;

(iv) estimating surface lines for said segments, wherein said line estimator is a least square estimator;

(v) checking for orthogonality to either combine said segments if both segments are parallel to each other or separate said segments if both segments are orthogonal to each other, wherein the dot product of said unit vectors representing said line segments is employed; and (vi) estimating said object position and orientation along the horizontal plane by comparing said estimated surface line(s) with the known knowledge about the object dimensions.

3. The method, as recited in claim 1, wherein said processing algorithm comprises the steps of:

(i) selecting an object template that reflects particular size and orientation of said object based on said estimated position and orientation along the horizontal plane;

(ii) comparing the selected object template to different image areas of said image data corresponding to the projected view of the vertical plane and determining the best-matched position; and (iii) determining the 3-dimensional object's position and orientation by combining said estimated position and orientation for the horizontal plane with said best-matched position and selected template orientation for the vertical plane.

4. The method, as recited in claim 1, wherein tilt angles are defined by a ground slope and determined from said gravity vector transformed into respective XYZ components along body-fixed axes.

5. The method, as recited in claim 1, wherein sensing platforms are able to be non-stationary, wherein the use of a known XYZ mapping of a gravity component as reference to said leveled condition allows said sensing platform to be non-stationary and slowly moving while gathering range and image data, wherein said ranging device and imager are able to be continuously active, and only ranging and imaging data taken at a time when said sensing platform is leveled are used for subsequent processing.

6. A method for object detection and identification, comprising the steps of:

(a) placing an object along a ground,
(b) assuming a sensing platform to have a complete 6 degrees of freedom motion, that is 3 degrees of freedom in translation and 3 degrees of freedom in rotation,
(c) ascertaining position and rotation information relative to said sensing platform by said object detection and identification, and
(d) using a tilt information, which corresponds to said ground slope and tilt angles of said object, wherein said object detection and identification is greatly simplified and accomplished with great efficiency at said leveled condition.

* * * * *